United States Patent [19]
Stine

[11] Patent Number: 5,142,103
[45] Date of Patent: Aug. 25, 1992

[54] ENCAPSULATED ELECTRICAL COMPONENT

[75] Inventor: Harold R. Stine, Delta, Ohio

[73] Assignee: R & R Plastics, Inc., Swanton, Ohio

[21] Appl. No.: 644,078

[22] Filed: Jan. 22, 1991

[51] Int. Cl.$^5$ .............................................. H01G 1/03
[52] U.S. Cl. ................................. 174/52.2; 264/272.18
[58] Field of Search ................... 174/52.2, 52.3, 52.4;
361/272, 301, 311, 312, 313, 314, 315, 324;
336/96; 264/272.11, 272.15, 272.17, 272.18,
272.19

[56] References Cited

U.S. PATENT DOCUMENTS

| | | | |
|---|---|---|---|
| 3,197,547 | 7/1965 | Peace, Jr. et al. | 174/52.2 |
| 3,204,164 | 8/1965 | Burke et al. | |
| 3,491,270 | 1/1970 | Gabriel et al. | 264/272.18 |
| 3,806,770 | 4/1974 | Voyles et al. | 264/272.18 |
| 3,839,238 | 10/1974 | Ealding | 264/DIG. 5 |
| 3,856,442 | 12/1974 | Gallagher et al. | 264/51 |
| 4,538,025 | 8/1985 | Coe et al. | 174/52.2 |
| 4,895,998 | 1/1990 | Bevington | 174/52.2 |

Primary Examiner—Leo P. Picard
Assistant Examiner—Bot Lee Ledynh
Attorney, Agent, or Firm—Willian Brinks Olds Hofer Gilson & Lione

[57] ABSTRACT

An encapsulated electrical capacitor in which an end and a major portion of the cylindrical outer shell of the capacitor is positioned within a cup-shaped sleeve before an outer housing is molded around the capacitor and sleeve. The sleeve has axially extending internal ribs which stiffen its outer annular wall to thereby help to prevent damage to the capacitor from hydraulic forces during the encapsulating process. The internal ribs also define insulating air spaces between one another, and this helps to reduce thermal conduction into the capacitor during the molding process. The outer housing is preferably formed from polypropylene, and the sleeve is preferably formed from a material which will retain a major portion of its strength and rigidity at the molding temperature of the outer housing, for example, a polyester material when the outer housing is formed from polypropylene.

13 Claims, 3 Drawing Sheets

ENCAPSULATED ELECTRICAL COMPONENT

BACKGROUND OF THE INVENTION

1. Field of the Invention

This invention relates to an encapsulated electrical component, for example, an encapsulated canister capacitor for use as a starting capacitor with an electrical motor, the encapsulation making the electrical component suitable for use in a submerged environment, for example, in conjunction with an electrical motor which is used to operate a submerged well pump.

2. Description of the Art

U.S. Pat. No. 4,895,998 (Bevington) discloses an encapsulated canister-type electrical capacitor assembly for use in conjunction with an electrical motor which is to be used to operate a submerged well pump. The assembly of this reference incorporates a canister-type motor starting capacitor which is made up of suitable electrical components within a cylindrical canister. The canister for a capacitor of this type has a relatively thin, metallic shell. The assembly further has a housing which surrounds and encapsulates the capacitor, the housing being formed from a polymeric material such as polypropylene by molding the polymeric material around the capacitor while the polymeric material is in a pliable state, and then allowing the polymeric material to cool into a substantially rigid shape. In practice, however, the molding of the polymeric material directly against the outer shell of the capacitor can lead to hydraulic deformation of the shell, which can possibly result in a degradation of the electrical properties of the capacitor. Further, in the molding of the polymeric material against the outer shell of the capacitor the polymeric material will normally be at a somewhat elevated temperature during the molding process, and the relatively continuous, surface to surface contact between the polymeric material at its molding temperature and the outer shell of the capacitor can result in an overheating of the capacitor, and this can also result in a degradation of the electrical properties of the capacitor.

SUMMARY OF THE INVENTION

According to the present invention there is provided an encapsulated electrical component of cylindrical configuration which avoids hydraulic deformation and/or thermal damage to the electrical component during the encapsulation process by utilizing an intermediate, preformed sleeve to surround at least a major cylindrical portion of the electrical component. The preformed sleeve is formed from a polymeric material which is different than the encapsulating material and which does not soften or deform at the molding temperature of the encapsulating material. For example, the preformed sleeve is formed from a polyester material when the encapsulating material is formed from polypropylene, preferably expanded polypropylene. Further, the inside of the preformed sleeve is provided with circumferentially spaced apart and longitudinally extending ribs, the innermost tips of which snugly engage the outside of the electrical component along circumferentially spaced apart, relatively narrow lines of contact. The preformed sleeve has sufficient rigidity, especially in view of its internal ribs which act as stiffening elements, to prevent the encapsulating material from imposing substantial, distortion producing hydraulic loads on the outside of the electrical container as the encapsulating material is molded against the outside of the sleeve. Further, the spaces between the ribs on the inside of the sleeve act as insulators which substantially reduce the conduction of heat into the electrical component from the encapsulating material, which will be at an elevated temperature during the molding process.

Accordingly, it is an object of the present invention to provide an improved encapsulated electrical component. More particularly, it is an object of the present invention to provide an encapsulated electrical component in which the electrical component has not suffered substantial hydraulic or thermal damage as a result of the encapsulating process.

For a further understanding of the present invention and the objects thereof, attention is directed to the drawing and the following brief description thereof, to the detailed description of the preferred embodiment, and to the appended claims.

DETAILED DESCRIPTION OF THE PREFERRED EMBODIMENT

Figure 2:
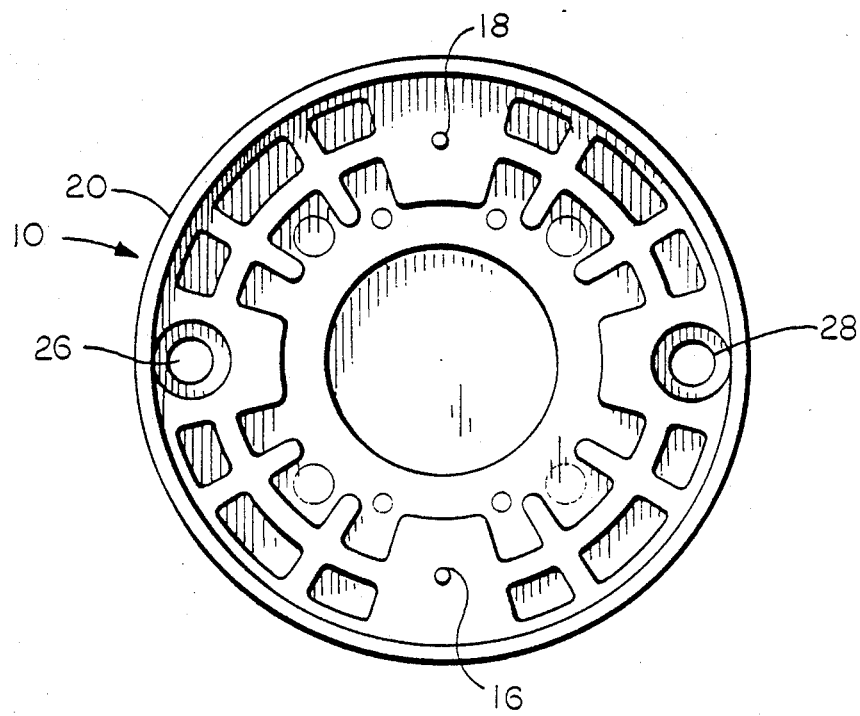
FIG. 2 is an elevational view of the encapsulated container of FIG. 1 illustrating the container from the other end thereof.
Figure 1:
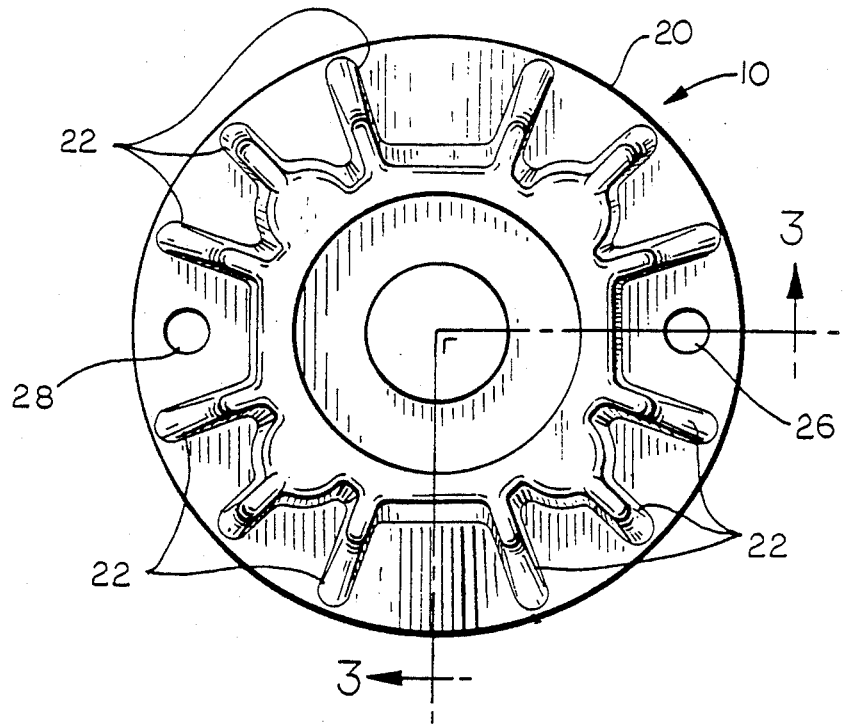
FIG. 1 is an elevational view of an encapsulated container according to the preferred embodiment of the present invention, FIG. 1 illustrating the encapsulated container from an end thereof.

An encapsulated electrical component according to the preferred embodiment of the present invention is an encapsulated electrical capacitor and is indicated generally by reference numeral 10 in the drawing. The encapsulated capacitor 10 includes a canister type capacitor 12 of the type frequently used as a starting capacitor for an electric motor. For example, the capacitor 12 may be of the type which is marketed by General Electrical Company as a Dielektrol ® capacitor. In any case, the capacitor 12 includes a pair of spaced apart electric terminals, only one of which, the terminal 14, is illustrated in the drawing. The terminal 14 and its counterpart terminal extend from an end of the capacitor 12, and are provided with extension leads 16, 18, respectively, for connection to the leads of an electric motor, not shown.

Figure 3:
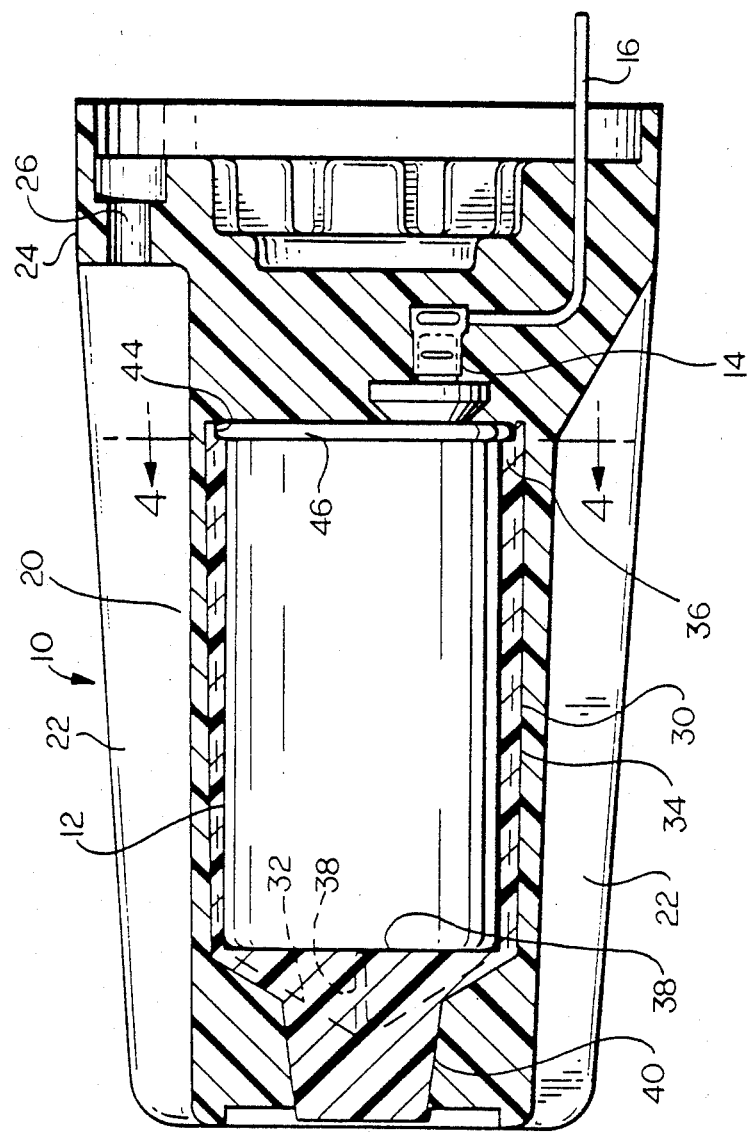
FIG. 3 is a sectional view taken on line 3—3 of FIG. 1.
Figure 4:
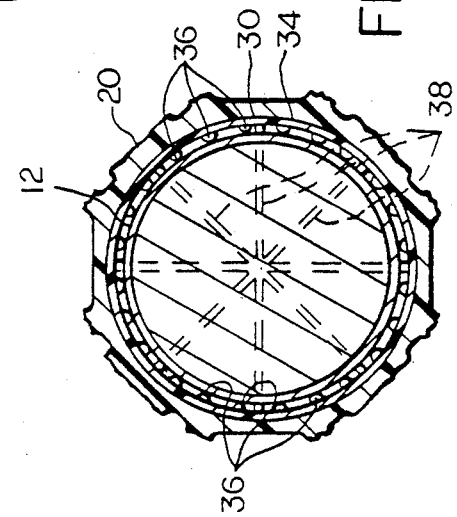
FIG. 4 is a sectional view taken on line 4—4 of FIG. 3.

The capacitor 12 is encapsulated in a continuous unitary housing 20 which is formed from a suitable moisture impermeable and resistant material to permit the capacitor 12 to be operated in a submerged environment, for example, in conjunction with a motor for operating a well pump. The housing 20, thus, is ideally formed by injection molding a suitable polymeric material around the capacitor 12. A suitable polymeric material for use in this application is polypropylene, preferably with a blowing agent added thereto to reduce the density thereof, for example, to a density of approximately 0.84 or 0.85 (from an original density of approximately 0.90), to ensure that the polypropylene will properly thereby expand to fill all voids within the mold, especially including the holes which would be left by the retaining pins of the mold tooling when the part is withdrawn from the tooling, and secondarily to slightly reduce the weight of the housing 20. It is also contemplated that an ABS (aorylonitrile butadiene styrene) terpolymer would be satisfactory in the manufacture of the housing 20. In any case, the housing 20 is configured to have a plurality of circumferentially spaced apart and axially extending outwardly projecting ribs 22 to rigidify the housing 20 and to assist in the dissipation of heat therefrom. A generally cylindrical end portion 24 of the housing 20 is provided with a diametrically opposed pair of axially extending bolt holes 26, 28 extending therethrough to faciiitate the attachment of the housing 20 to an electric motor. As illustrated in FIG. 3, the configuration of the housing 20 is slightly tapered along its longitudinal axis to facilitate its withdrawal from a mold, not shown.

Prior to the formation of the housing 20 around the capacitor 12, the capacitor is inserted into a cup-shaped protective sleeve 30, the protective sleeve having a closed end 32 and a generally cylindrical portion 34 which closely surrounds at least a major cylindrical portion of the capacitor 12. (See also FIGS. 5 and 6). The inside surface of the cylindrical portion 34 is provided with a plurality of circumferentially spaced apart and axially extending ribs 36 the innermost tips of which snugly engage the outer surface of the capacitor 12.

The sleeve 30 is preferably formed from a polymeric material which will not deform or soften at the molding temperature of the material of the housing 20. For example, an injection molded, glass filled polyester sleeve 30 is quite suitable when the housing 20 is formed from polypropylene, as previously described. Such a sleeve 30 will protect the shell of the capacitor 12 from deformation under the hydraulic loads which would otherwise be imposed on the canister 12 during and as a result of the process of injection molding the housing 20 around the capacitor 12. The internal ribs 36 of the sleeve 30 tend to rigidify the cylindrical portion 34 thereof and thereby assist in preventing any localized hydraulic deformation of the capacitor 12. Further, the internal ribs 36 form longitudinally extending air pockets therebetween, and these air pockets act as thermal insulators and reduce thermal conduction into the capacitor 12 from the surrounding elevated temperature material of the housing 20 during the molding process, thus helping to prevent thermal degradation of the capacitor 12 during the molding process.

It is desirable that the material of the housing 20 bond to the sleeve 30 during the encapsulating process. While polypropylene does not normally bond to polyester, even at the molding temperature of polypropylene, it may be made adherent to polyester by blending a small amount of a suitable chemical grafting material therein. Materials of this type are available from Polymer Research Corporation of America in Brooklyn, N.Y.

The closed end 32 of the sleeve 30 has a generally conical configuration, with its apex pointed away from the open end of the sleeve 30. However, to avoid wedging of the capacitor 12 within the conical closed end 32 of the sleeve 30, and to avoid wobbling of the capacitor 12 within the sleeve 20, the inside of the closed end is provided with a series of radially extending, intersecting triangular ribs 38. The outermost edges of the ribs 38 are coplanar and form a base to securely position the capacitor 12 within the sleeve 30 and to prevent wobbling therebetween.

Figure 5:
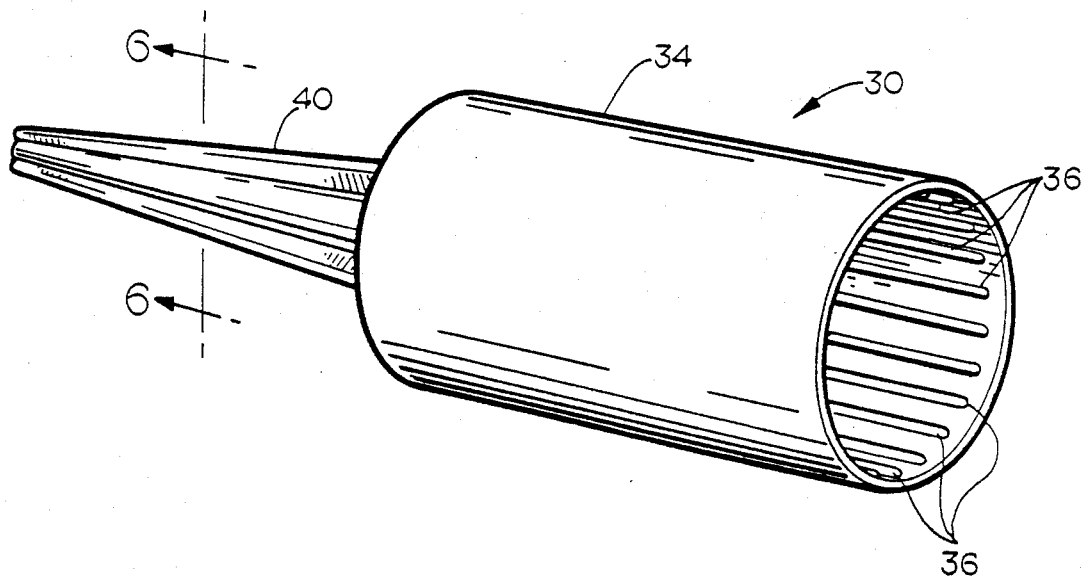
FIG. 5 is a perspective view of an article which is used in the manufacture of the container of FIGS. 1-4.
Figure 6:
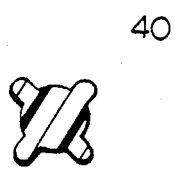
FIG. 6 is a sectional view taken on line 6—6 of FIG. 5.

The conical configuration of the closed end 32 of the sleeve 30 assists in the flow of the material of the housing into a mold cavity (not shown) where the encapsulating process is taking place. The flow is further assisted by providing the closed end 32 with a generally conical extension 40 of reduced radial extent and of a generally star-shaped cross-section, as is best shown in FIGS. 5 and 6. The extension 40 has an outermost tip 42, and during the encapsulating process the tip 42 is positioned adjacent to the sprue bushing of the mold changing equipment (not shown) through which the material of housing 20 is charged into the encapsulating mold. The extension 40 also assists in precisely positioning and aligning the sleeve 30 during the encapsulating process. After the encapsulated capacitor is removed from the encapsulating mold, the portion of the extension 40 which extends beyond the housing 20, a portion which is illustrated in broken line in FIG. 3, is removed in a severing or other removal operation, and the seam between the inside opening of the housing 20 and the adjacent periphery of the extension 40 is sealed, if it does not self-seal during the encapsulating process.

The sleeve 30, as described, is preferably integrally formed in a single piece with a cylindrical portion 34 sized, in its axial extent, to terminate at the terminal end of the capacitor 12, and preferably with an annular recess 44 which snugly receives a chime 46 at the terminal end of the capacitor 12. However, it is contemplated that the cylindrical portion 34 may be made up of a portion which does not extend to the chime 46 and another portion which is mechanically joined thereto and which does not extend to the chime 46. This will allow a basic size sleeve 30 to be adapted for use with capacitors of different axial lengths.

Although the best mode contemplated by the inventor for carrying out the present invention as of the filing date hereof has been shown and described herein, it will be apparent to those skilled in the art that suitable modifications, variations, and equivalents may be made without departing from the scope of the invention, such scope being limited solely by the terms of the following claims.

What is claimed is:

1. An encapsulated electrical component assembly, said assembly comprising:
   a generally cylindrical electrical component having electrical conductor means extending from an end thereof;
   a protective sleeve having a cylindrical portion which surrounds at least a major portion of the electrical component, said cylindrical portion having a plurality of inwardly projecting spaced apart rib means which snugly engage said major portion of the electrical component; and
   a unitary housing sealingly encapsulating said electrical component and said sleeve, said unitary housing being formed by molding a polymeric material around said electrical component and said sleeve, said electrical conductor means extending through said unitary housing.

2. An encapsulated electrical component according to claim 1 wherein said cylindrical portion of said protective sleeve and said rib means are formed integrally in a single piece.

3. An encapsulated electrical component according to claim 2 wherein said rib means comprises a plurality of circumferentially spaced apart and longitudinally extending ribs, said ribs defining a plurality of insulating spaces therebetween, said insulating spaces retarding the conduction of heat from said polymeric material to said electrical component during the molding of said unitary housing.

4. An encapsulated electrical component assembly according to claim 1 wherein said polymeric material is mainly comprised of polypropylene, and wherein said protective sleeve is formed from a second polymeric material, said second polymeric material being mainly comprised of a polyester.

5. An encapsulated electrical component assembly according to claim 4 wherein said second polymeric material is mainly comprised of a glass-filled polyester.

6. An encapsulated electrical component assembly according to claim 5 wherein said polymeric material comprises a blowing agent to reduce its density to not substantially greater than 0.85.

7. An encapsulated electrical component assembly, said assembly comprising:
- a generally cylindrical electrical component having a first end and a second end and electrical conductor means extending from one of said first end and said second end;
- a generally cup shaped protective sleeve having a closed end positioned adjacent the other of said first end and said second end of said electrical component, said protective sleeve further having a cylindrical portion and an open end positioned adjacent said one of said first end and said second end of said electrical component, said cylindrical portion of said protective sleeve surrounding the portion of said electrical component beginning with said other of said first end and said second end thereof and extending toward said one of said first end and said second end thereof; and
- a unitary housing sealingly encapsulating said electrical component and said sleeve, said unitary housing being formed by molding a polymeric material around said electrical component and said sleeve, said electrical conductor means extending through said unitary housing;
wherein said other of said one of said first end and said second end of said electrical component is substantially flat, wherein said closed end of said protective sleeve is substantially conical in its exterior configuration, and wherein said protective sleeve further comprises rib means extending across said closed end of said protective sleeve on the interior thereof, said triangular rib means engaging said other of said one of said first end and said second end of said electrical component and said protective sleeve.

8. An encapsulated electrical assembly according to claim 7 wherein said cylindrical portion of said protective sleeve comprises a plurality of inwardly projecting spaced apart rib means which snugly engage said portion of said electrical component.

9. An encapsulated electrical assembly according to claim 7 wherein said closed end, said cylindrical portion, said triangular rib means, and said rib means are formed integrally in a single piece.

10. An encapsulated electrical assembly according to claim 9 wherein said rib means comprises a plurality of circumferentially spaced apart and longitudinally extending ribs, said ribs defining a plurality of insulating spaces therebetween, said insulating spaces retarding the conduction of heat from said polymeric material to said electrical component during the molding of said unitary housing.

11. An encapsulating electrical component assembly according to claim 10 wherein said polymeric material is mainly comprised of polypropylene, and wherein said protective sleeve is formed from a second polymeric material, said second polymeric material being mainly comprised of a polyester.

12. An encapsulated electrical component assembly according to claim 15 wherein said second polymeric material is mainly comprised of a glass-filled polyester.

13. An encapsulated electrical component assembly according to claim 12 wherein said polymeric material comprises a blowing agent to reduce its density to not substantially greater than 0.85.

* * * * *